United States Patent
Marzolin et al.

(10) Patent No.: US 7,309,664 B1
(45) Date of Patent: Dec. 18, 2007

(54) SUBSTRATE WITH A PHOTOCATALYTIC COATING

(75) Inventors: Christian Marzolin, Paris (FR); Arnaud Marchal, Chantilly (FR); Xavier Talpaert, Paris (FR)

(73) Assignee: Saint-Gobain Recherche, Aubervilliers (FR)

( * ) Notice: Subject to any disclaimer, the term of this patent is extended or adjusted under 35 U.S.C. 154(b) by 0 days.

(21) Appl. No.: 09/719,153

(22) PCT Filed: Jun. 10, 1999

(86) PCT No.: PCT/FR99/01375

§ 371 (c)(1),
(2), (4) Date: Mar. 16, 2001

(87) PCT Pub. No.: WO99/64364

PCT Pub. Date: Dec. 16, 1999

(30) Foreign Application Priority Data

Jun. 10, 1998 (FR) .................. 98 07276

(51) Int. Cl.
*B32B 27/04* (2006.01)
*B32B 27/12* (2006.01)
*B32B 5/02* (2006.01)

(52) U.S. Cl. .............. 442/97; 442/101; 442/117; 442/120; 428/429; 428/433; 428/905; 428/292.1

(58) Field of Classification Search ........ 442/97, 442/101, 117, 120; 428/292, 429, 433, 905
See application file for complete search history.

(56) References Cited

U.S. PATENT DOCUMENTS

| | | | |
|---|---|---|---|
| 4,211,813 A * | 7/1980 | Gravisse et al. ........... 442/76 |
| 4,485,146 A | 11/1984 | Mizuhashi et al. | |
| 4,898,789 A | 2/1990 | Finley | |
| 4,997,576 A | 3/1991 | Heller et al. | |
| 5,165,972 A | 11/1992 | Porter | |
| 5,342,676 A | 8/1994 | Zagdoun | |
| 5,348,805 A | 9/1994 | Zagdoun et al. | |
| 5,547,823 A * | 8/1996 | Murasawa et al. .......... 204/155 |
| 6,037,289 A * | 3/2000 | Chopin et al. ............. 502/2 |
| 6,103,363 A | 8/2000 | Boire et al. | |
| 6,113,861 A * | 9/2000 | Ogata ..................... 422/122 |
| 6,326,079 B1 | 12/2001 | Philippe et al. | |

FOREIGN PATENT DOCUMENTS

| | | | |
|---|---|---|---|
| JP | 08252305 | * | 10/1996 |
| JP | 08252305 A | * | 10/1996 |
| JP | 08269391 A | * | 10/1996 |
| JP | 10025696 A | * | 1/1998 |

OTHER PUBLICATIONS

"Comparable." Webster's Ninth New Collegiate Dictionary, 1986.*
Application of Powder Diffraction for Study of Nanomaterials, Mar. 3, 2005, <http://www.xrd.us/applnote/nanomaterials.htm>.*
Opposition filed by Glaverbel.
Opposition filed by Pilkington PLC.
Opposition filed by Toto LTD.
Opposition filed by Sternagel, Fleischer, Godemeyer.
Pt-TiO$_2$ Thin Films on Glass Substrates as Efficient Photocatalysts, Journal of Materials Science, 24 (1989), pp. 243-246.
EP 0581 216, Okada et al., Feb. 2, 1994.
Preparation of TiO$_2$ Fine Particles Supported on Silica Gel as Photocatalyst, Yasumori et al., Journal of the Ceramic Society of Japan, 102 (1994).
Photocatalytic Properties of TiO$_2$, Wold, Chem. Mater., 1993, 5, pp. 280-283.
Kristallstruktur und Optische Eigenshaften von Dunnen Organogenen Titanoxyd-Schichten Auf Glasunterlagen [Crystal Structure and Optical Properties of Thin Organogenic Titanium Oxide Layers on Glass Substrates], Bach et al., Thin Solid Films I (1967/68), pp. 255-276, and English translation.
816 466, Hayakawa et al., Jan. 7, 1998.
The Effect of Substrate Temperature on the Properties of Sputtered Titanium Oxide Films, Meng et al., Applied Surface Science 65/66 (1993) pp. 235-239.
Sol-Gel-Derived TiO$_2$ Film Semiconductor Electrode for Photocleavage of Water, Yoko et al., J. Electrochem Soc., vol. 138(8), Aug. 1991, pp. 2279-2284.
Dip-Coating of TiO$_2$ Films Using a Sol Derived from Ti(O-i-Pr)$_4$-diethanolamine-H$_2$-O-i-PrOH System, Takahashi et al., Journal of Materials Science 23 (1988), 7 Pages.
A Structural Investigation of Titanium Dioxide Photocatalysts, Bickley, et al., Journal of Solid State Chemistry 92, 1991, pp. 178-190.

(Continued)

Primary Examiner—Norca L. Torres-Velazquez
(74) Attorney, Agent, or Firm—Oblon, Spivak, McClelland, Maier & Neustadt, P.C.

(57) ABSTRACT

A substrate, its process of manufacture, and its applications. The substrate includes a fibrous material which is provided, over at least a portion of its surface and/or within its thickness, with a coating with photocatalytic properties including a semi-conducting material with photocatalytic properties of the oxide or sulphide type.

19 Claims, 2 Drawing Sheets

OTHER PUBLICATIONS

Highly Transparent and Photoactive $TiO_2$ Thin Film Coated on Glass Substrate, Fukayama et al., Abstract 735, 187th Electrochemical Society Meeting, Mar. 29, 1995.

EP 684,075, Wantanabe et al., Nov. 29, 1995 and the front page of WO 95/15816, Watanabe et al., Jun. 15, 1995, which is an equivalent of EP 684,075 and contains an English abstract.

EP 650 938 A1, Boire et al., May 3, 1995.

Oxide Layers Deposited from Organic Solutions, H. Schroeder in Physics of Thin Films: Advances in Research and Development, pp. 105-112, vol. 5, 1969 Academic Press.

EP 737 513A1, Fujishima et al., Oct. 16, 1996.

JP 267476/94, Fujishima et al., publication date not listed, and Derwent WPIndex abstract; corresponds to EP 737 513A, (submitted herewith under Tab 17); WO 96/13327 (of record; published on May 9, 1996); and U.S. 6,387,844 (of record).

WO 97/07069, Heller, Feb. 27, 1997.

JP 63-100042, Kume et al., May 2, 1988.

EP 0 071 865A2, Mizuhashi et al., Feb. 16, 1983.

GB 2,031,756A, Gordon, Apr. 30, 1980.

EP 0 348 185, Jenkins et al., Dec. 27, 1989.

JPA 63-5301 Matsushita Electric Works Ltd. (assignee), Jan. 11, 1988, and Derwent WPIndex abstract.

JPA 63-5304, Matsushita Electric Works Ltd. (assignee), Jan. 11, 1988, and Derwent WPIndex abstract.

JP 91042/1986, Yokoishi, May 9, 1986.

JPA 7-222928, Chikuni et al., Aug. 22, 1995, and Derwent WPIndex abstract; equivalent of WO 95/15816 (submitted herewith) and U.S. 5,853,866 (of record), 6,210,779 (submitted hereiwth), 6,294,246 (submitted herewith), and 6,294,247 (submitted herewith).

JPA 1-218635, Hitachi LTD (assignee), Aug. 31, 1989, and Derwent WPIndex abstract.

JPA 7-111104, Fujishima et al., Apr. 25, 1995, and Derwent WPIndex abstract.

Preparation of Transparent $TiO_2$ Thin Film Photocatalyst and Its Photocatalytic Activity, Negishi et al., Chemistry Letters 1995, No. 9, pp. 841-842.

EP 633 064, Murasawa et al., Jan. 11, 1995.

EP 590 477, Ogawa et al., Apr. 6, 1994.

EP 675 086, Okada et al., Oct. 4, 1995.

JP-A-5 253 544, Toto LTD (assignee), Oct. 5, 1993, and Derwent WPIndex abstract.

JP-A-6-65012, Agency of Ind. Sci. & Technology (assignee), Mar. 8, 1994, and Derwent WPIndex abstract.

EP 636 702, Shimizu et al., Feb. 1, 1995.

Electrical and Electrochemical Properties of $TiO_2$ films Grown by Organometallic Chemical Vapour Deposition, Takahashi et al., J. Chem. Soc., Faraday Trans 1, 1982, 78, pp. 2563-2571.

EP 489 621, Zagdoun et al., Jun. 10, 1992.

Apr. 3, 2001 Letter from Mrs. Colette Ward, Patent Litigation Enquiries, British Library.

Table showing values of roughness (Root Mean Square) of various coated glass samples available to the public at the priority date of EP 850 024.

\* cited by examiner

SUBSTRATE WITH A PHOTOCATALYTIC COATING

BACKGROUND OF THE INVENTION

1. Field of the Invention

The present invention relates to substrates provided with a photocatalytic coating, and to the process for producing such a coating and to its various applications.

It relates more particularly to coatings comprising semi-conducting materials based on metal oxide, in particular on titanium oxide, which are capable of initiating radical reactions under the effect of radiation of appropriate wavelength, resulting in the oxidation of organic products. These coatings thus make it possible to confer novel functionalities on the materials, which they cover, in particular dirt-repellent, fungicidal, bactericidal, algicidal or odour-controlling properties, optionally in combination with hydrophilic or anti-condensation properties, and the like.

2. Discussion of the Background

Highly diverse substrates have to date been envisaged, in particular construction materials used in the field of construction or vehicles (windows, facing, cladding or roofing materials, and the like) or materials used in purification processes.

International Patent Applications WO97/10186 and WO97/10185 have thus made known coatings comprising anatase, crystallized $TiO_2$ with photocatalytic properties, coatings obtained from the thermal decomposition of appropriate organometallic precursors and/or from "precrystallized" $TiO_2$ particles, suited in particular to deposition as a thin layer on glass in order to preserve its optical quality.

Patent Application EP-A-0,306,301 has also made known the use of photocatalytic $TiO_2$ on fibrous materials used to purify the air, the deposition of the $TiO_2$ being carried out by a process of sol-gel type.

SUMMARY OF THE INVENTION

The aim of the invention is then the improvement of these photocatalytic coatings, being targeted in particular at improving their behaviour on any type of substrate and in particular providing them with better adhesion and better durability, particularly on substrates exhibiting characteristics of surface roughness of porosity.

The subject-matter of the invention is first of all a substrate comprising a fibrous material which is provided, over at least a portion of its surface and/or within its thickness, with a coating with photocatalytic properties comprising a semi-conducting material with photocatalytic properties of the oxide or sulphide type in combination with a promoter of adhesion to the said fibrous material.

The semi-conducting material "active" with respect to photocatalysis can be, according to the invention, based on at least partially crystallized metal oxide, for example zinc oxide, tin oxide or tungsten oxide. The preferred example according to the invention relates to titanium oxide at least partially crystallized in anatase form, which is the crystalline phase which confers on $TiO_2$ its photocatalytic properties. It can also relate to semi-conductors belonging to the family of the sulphides, also at least partially crystallized, such as zinc sulphide or boron sulphide. (In the continuation of the text, for greater simplicity, mention will be made of titanium oxide, it being understood that the information given will be just as valid for the other semi-conducting materials mentioned above).

The term "fibrous material" is understood to mean, within the meaning of the invention, any material comprising fibres, in particular mineral fibres, more particularly organized fibres made of glass or rock mineral wool, of the type of those used in thermal/sound insulation or to constitute soilless culture substrates. This term "fibrous material" also includes fibres/filaments organized as strands, of the type of the strands used in reinforcement, in particular made of glass.

These base fibrous materials are subsequently incorporated in a "substrate", within the meaning of the invention, in various forms: it can relate to felts, mats, webs, "moulds" intended for the insulation of pipes, made of mineral wool, textile strands assembled as fabrics, or non-woven web, made of substrates of paper type, and the like.

A photocatalytic coating makes it possible to confer highly advantageous novel functionalities on these known substrates. Thus, the feltsmats of mineral wool mainly used in insulation can be treated only superficially, only on one of their faces, for example, or on each of their faces, and can acquire a dirt-repellant/odour-controlling function on at least one of their treated faces (the visible face and/or the hidden fact) in false ceiling structures of buildings, in antinoise screens alongside roads or railways, and the like, the condition laid down being that the photocatalytic coating is accessible to a natural or artificial light source. Still in the field of insulation, the "moulds" can also be treated on the inside and/or outside or over their entire thickness, for example, in order to confer on them a dirt-repellant and/or bactericidal or fungicidal function. In the form of mats or of moulds, the substrates treated according to the invention can advantageously be positioned around outlet conduits in any ventilation or air-conditioning system but also by being positioned inside these conduits, these devices being vertiable breeding grounds for bacteria, the condition being that it is necessary to provide means for the photocatalytic coating to be exposed to sufficient ultraviolet radiation to be effective: on a visible external face, natural illumination may be sufficient. If not, the substrates have to be combined with artificial illuminating means of the halogen lamp or fluorescent tube type.

Another application relates to any system for reflecting and/or scattering natural light or light originating from artificial illuminating means, such as lampshades or curtains, when the substrate is, for example, in the web form.

The other main application, apart from thermal or sound insulation, of the substrates treated according to the invention relates to the filtration or the purification of fluids.

The term "filter" covers two notions within the meaning of the invention, both the notion of true filtration, where particles are separated mechanically from the gas carrying them, and the notion of diffuser, in particular of odour-controlling diffuser, where the gas to be treated is not necessarily forced to pass through the photocatalytic substrate, where it can in particular simply be brought into contact with the latter, without retaining the suspended particles.

Mention may be made of many other applications of the gas "filters" according to the invention: they can also be used to purify any type of industrial gaseous effluent or any atmosphere of a given public place or building (as odour-controlling diffuser in the underground, for example). They can in particular make it possible to reduce the "VOC" (volatile organic compounds) level of a given gas stream or of a given atmosphere.

The filters, surface-treated or treated throughout their thickness, can become much more effective and much more durable; this is because the treatment according to the invention gives them the ability not only to remove microorganisms but also to decompose organic residues of fatty type, for example, particles which gradually block the filter. With the invention, these filters therefore have a longer lifetime. In addition, they have an odour-controlling function.

It can also relate to filters for liquids.

The liquid filters according to the invention have numerous applications: they can be used for the recycling of wastewater or for the recycling of water from systems for the irrigation of soilless culture substrates (for disinfecting the water). They can also fulfil a function of depollution, in particular depollution of soils, or a function of reprocessing/depolluting industrial liquid effluents.

The advantage of treating all these fibrous substrates according to the present invention has been seen. However, to furnish term with a photocatalytic coating was not, initially, very easy. This was because the question arose of the method of deposition of the coating on a substrate which is generally non-smooth, non-flat and of rough and porous type, as well as the question of the durability of this coating.

The solution of the invention consisted in adjusting the way in which it was applied to the substrate, namely superficially or throughout its thickness, according to the applications targeted as a function of requirements, and in rending the anatase $TiO_2$ of the coating, which is responsible for the photocatalytic performance, integral with the fibrous material via an appropriate adhesion promoter. The latter can thus act as "matrix" for the components of the coating which are "active" with respect to the photocatalysis phenomenon.

According to a first embodiment of the present invention, the titanium oxide is already at least partially precrystallized in anatase form when it is incorporated in the coating, before being deposited on the substrate. It can be introduced into the coating in the form of crystalline particles in colloidal suspension or in the form of a dry power composed of particles which are optionally more or less agglomerated with one another. This alternative form exhibits the advantage of not imposing a high specific heat treatment on the coating/substrate on which it is deposited ($TiO_2$ crystallizes in the anatase form generally in the vicinity of 400° C.).

According to a second embodiment of the present invention which can be combined with the first embodiment, the titanium oxide originates from the thermal decomposition of precursors, in particular of the organometallic or metal halide type, within the coating. The anatase crystallized $TiO_2$ can thus be manufactured "in situ" in the coating, once applied to the substrate, by providing for an ad hoc heat treatment, which must, however, be compatible with the chosen substrate and the chosen adhesion promoter.

The adhesion promoter can be single- or multicomponent, and its component or components can be organic, inorganic or organic/inorganic "hybrids".

It can thus comprise a silicon-comprising component, in molecular form or in polymeric form, of the silane, silicone or siloxane type, for example. This is because these components exhibit a good affinity with the majority of mineral fibres, glass, rock or even ceramic, affecting the invention. It is even possible, in some cases, to speak of a kind of grafting of the crystallized $TiO_2$ to the inorganic fibres by this type of component.

The adhesion promoter can also comprise one or more polymers of organic type. In fact, two scenarios exist: standard organic polymers, for example of the acrylic or phenol-formaldehyde type, or the like, can be chose. In this case, there is a risk of this component being gradually decomposed by photocatalysis by the $TiO_2$, at least in the surface regions of the substrate liable to be exposed to ultraviolet radiation. However, the process can in fact prove to be advantageous in some applications, by thus gradually "releasing" active $TiO_2$. However, it may be preferably to avoid or slow down as far as possible this decomposition by choosing appropriate polymers, generally fluorinated polymers, which are highly resistant to photocatalytic attacks, for example of the fluorinated acrylic polymer type, of the polytetrafluoroethylene (PTFE), poly (vinylidene fluoride) (PVDF) or tetrafluoroethylene-ethylene copolymer (ETFE) type, and the like.

One alternative is retaining an adhesion promoter based on organic polymer(s) and thwarting their decomposition by appropriate additives, in particular belonging to the family of the antioxidants (such as the product sold under the name Irganox by the company Ciba) and/or of the ultraviolet absorbers (such as the product sold under the name Tinuvin by the same company) and/or of stabilizers in the form of sterically hindered amines known under the term "hindered amine light stabilizers" or "HALS".

The adhesive promoter can also comprise at least one metal oxide of the $TiO_2$ or $SiO_2$ type originating from the thermal decomposition of precursors of the silicon-comprising, organometallic or metal halide type within the coating. In this case, the $TiO_2$ or $SiO_2$ component is generated in situ in the coating, in particular once applied to the substrate, by an appropriate heat treatment compatible with the substrate. In the case of $TiO_2$, it is not, however, necessary to envisage very high temperatures necessary for an anatase crystallization, if only an adhesion promoter function is being sought: it can perfectly well be amorphous or partially crystallized in various crystalline forms, just like $SiO_2$. It is thus possible to have a coating of the amorphous metal oxide matrix type which fixes the "active" particles of crystallized photocatalytic oxide.

The adhesion promoter can also comprise at least one inorganic component chosen from aluminium phosphates and potassium or calcium aluminosilicates.

One embodiment of the invention consists in that at least one of the two essential components of the coating, namely, on the one hand, the "active" (with regard to photocatalysis) components and, on the other hand, the adhesion promoter, forms part of the binder making possible the intrinsic cohesion of the fibrous material.

This is because, if the material is glass or rock mineral wool of the insulation type, such as that produced by Isover Saint-Gobain, the latter is in numerous applications provided with a binder generally denoted under the name of size and generally applied in the liquid phase by spraying under the fiberizing devices. The solvent/dispersant is generally aqueous and it evaporates on contact with or in the vicinity of the hot fibres. The agents for sticking the fibres to one another, generally of the resin type, for example phenolic resin, such as urea-phenol-formaldehyde polymers, cure under hot conditions. One possibility then consists in adding the adhesion promoter and the "active" components to the aqueous medium of the size or even in using/adapting the components of the size in order for them to act simultaneously as binder of the fibres to one another and of promoter of fibres/"active" components adhesion.

For further details on typical sizing compositions and their method of application to fibres, reference may advantageously be made in particular to Patents EP-148,050, EP-246,952, EP-305,249, EP-369,848, EP-403,347, EP-480,778 and EP-512,908. However, it should be noted that, in specific applications, the mineral wool can be devoid of binder, for example that composed of relatively fine fibres used to prepare filter papers, as disclosed, for example, in Patents EP-0,267,092 and EP-0,430,770, or needled felts.

If the material is instead a fibrous material of reinforcing strands or textile strands type, in particular such as that manufactured by Vetrotex, the cohesiveness of the strands resulting from the assembling of individual filaments under a bushing is generally provided by application of a binder generally denoted under the term of sizing composition. Here again, it is applied in the liquid phase and comprises one or more agents "sticking together" the fibres/filaments. It is therefore possible to choose to add the "active" components and/or the adhesion promoter according to the invention to the liquid medium or to adapt its composition in order to make it act both as interfilament binder and as promoter of strands/"active" components adhesion.

For further details on sizing compositions, reference may advantageously be made in particular to Patents EP-243,275, EP-394,090, EP-635,462, EP-657,396, EP-657,395, EP-678,485, EP-761,619 and WO-98/18737.

Mention may also be made of Patent WO-98/51633, relating to the deposition of size in two steps under the fiberizing device, size in addition being capable of polymerizing at room temperature. In this case, it is possible to choose to introduce the material with photocatalytic properties either into the first sizing composition or into the second or into both.

All these sizes mentioned above are generally applied, using sizing rolls just under the bushing, to the fibrous material still in the form of individual filaments in the course of being gathered together into strands. There also exist binders, intended to ensure the cohesion of mats obtained from a blanket of glass strands, which are ejected onto continuous or non-continuous strands which have already been sized. Mention may be made, by way of example, of Patent WO-97/21861. The photocatalytic material can be incorporated in this binder, which also acts as adhesion promoter.

The sizes or binders mentioned above are either in the aqueous phase or in the non-aqueous phase. In the latter scenario, a heat treatment is generally no longer necessary to remove the water, the components chosen then being chosen so as to be able to polymerize at room temperature. In this case, the incorporation of materials with photocatalytic properties pre-existing independently of any heat treatment is favoured, such as small crystallized titanium oxide particles.

As mentioned above, the fibrous material according to the invention can therefore be organized in the web (facing, for example), felt or paper form or in various geometric forms (flat or pleated paper type sheets, for example, panel, hollow cylindrical "mould", woven or non-woven web, and the like). The fibrous material can also be in bulk, in the form of optionally graded short fibre or flocks.

The photocatalytic coating of the invention is advantageously applied to the fibrous material so that at least a portion of the "fibres" of the said material (including the notions of fibres, of filaments and of strands) is sheathed with the coating over a thickness of at least 5 nm, in particular over a thickness of the order of 30 to 50 nm.

This sheathing ensures maximum effectiveness of the coating, its photocatalytic activity increasing as it is distributed over a greater specific surface. The preferred thickness takes into account the most commonly encountered means size of the anatase $TiO_2$ crystallites.

Another subject-matter of the invention is the processes for the manufacture of the substrates defined above.

According to a first alternative form, the photocatalytic coating is deposited, in the liquid phase, on the production line itself for the fibrous material. The advantage to this alternative form lies in the fact that the still semi-finished fibrous material can be treated an the best use can be made of the temperature which it is at, for example, resulting in a saving in terms of time and of production cost. This, a first embodiment consists in "hot" depositing the coating between the fiberizing devices and the devices for receiving the fibres. The fiberizing devices can consist of glass centrifuging dishes, known as "internal centrifuging devices", such as ones disclosed, for example, in Patents EP-0,189,534 and EP-0,519,797, making it possible to fiberize mineral wool of glass type, or devices for fiberizing by so-called external centrifuging using a succession of centrifuging wheels, such as ones disclosed, for example, in Patents EP-0,465,310 or EP-0,439,385, making it possible to obtain mineral wool of basalt rock type. It can also relate to devices for fiberizing by mechanical drawing, in order to obtain reinforcing glass strands, by air blowing or by steam blowing, according to processes well known to persons skilled in the art. Use is thus made of the fact that the fibres are still at a relatively high temperature by applying the coating, generally in solution/dispersion, in a solvent, for example an aqueous solvent, which evaporates on contact with or in the vicinity of the fibres. The heat can also make it possible to cure the component or components of the adhesion promoter, if they are of the resin type, or to decompose them thermally, if they are of the silicon-comprising precursor or metallic precursor type mentioned above.

As mentioned above, the coating in the liquid phase can be applied at the same time as an optional "binder" of the sizing composition type or event form part of it. It may also be preferable to apply it to the fibrous material before or after the said "binder".

According to a second embodiment of this first alternative form, the photocatalytic coating, still generally in the liquid phase, can be deposited "after" the receiving devices which collect the fibres/filaments or strands resulting from the fiberizing devices and in particular before or during the post-fiberizing heat treatment of the fibrous material. Thus, for mineral wool of insulation type, the receiving devices are generally composed of a suction conveyor belt which gathers together the mineral wool and passes it into a forming oven. It can be judicious to apply the coating between the two devices (fiberizing/receiving), for example superficially, and to use the heat of the oven to cure or complete the coating, if necessary.

Likewise, in the field of reinforcing glass, the strands are drawn and would off in the form of spools or cut up under the bushing, after having been appropriately sized, and then generally dried in heated chambers, before being converted and/or used.

As mentioned above, it is therefore possible to deposit the photocatalytic coating just under the bushing, in particular concomitantly with the deposition of the size, in which it can be incorporated. It is also possible to deposit it during the stage of finishing the spooled strands into finished products: it can, for example, relate to the conversion operation targeted at manufacturing mats of chopped strands, in a subsequent operation; it is also possible to deposit it on the downstream line, in particular during the conversion of the continuous strands, gathered together as a blanket, into a mat of continuous strands.

In the last two cases, the photocatalytic coating can be deposited by an ejection system of the adjusted sprayer type, before, during or at the same time as the binder used (or be used in combination with it in the same liquid phase).

According to a second alternative form, the photocatalytic coating is deposited in the liquid phase on the finished fibrous material, in a subsequent operation. What this involves is instead a "cold" treatment, requiring a post-deposition heat treatment in order to evaporate the solvent and optionally to cure or to complete, to constitute the coating.

Whatever the alternative form chosen, the coating can be deposited by different techniques. If the coating comprises "active" anatase crystallized $TiO_2$ powder or particles from the start, it is not necessary for the fibrous substrate to be very hot; temperatures of less than 300° C. and even of less than 200° C. may suffice, indeed even room temperature, and therefore temperatures which are found on production lines for the commonest mineral fibrous material, temperatures which are in addition compatible with the sizes for these materials, which are generally organic, at least partly. If, on the other hand, it is necessary to generate anatase $TiO_2$ "in situ", it is necessary to envisage temperatures of the order of 400° C., instead with fibrous materials devoid of binder in the general sense of the term and in a subsequent operation, for example by a process of sol-gel type.

In concrete terms, it is possible to choose to impregnate the fibrous material to the core and to use a technique of "dip-coating" type, where the fibrous material is at least partially immersed in a bath comprising the coating in the liquid phase. It is also possible to choose coating or spraying adapted to a surface treatment. The deposition can also be carried out in a fluid which is non-liquid in the usual snes of the term, for example in a hypercritical fluid.

Another subject-matter of the invention relates to the application of these treated substrates to thermal/sound insulation or facing material, with a dirt-repellant, fungicidal, antibacterial or odour-controlling function, or to liquid or gas filters of paper type or of felt or mould type.

BRIEF DESCRIPTION OF THE DRAWINGS

Other advantageous details and characteristics of the invention become apparent from the non-limiting embodiments described below in reference to the following figures.

DESCRIPTION OF THE PREFERRED EMBODIMENTS

Figure 1:
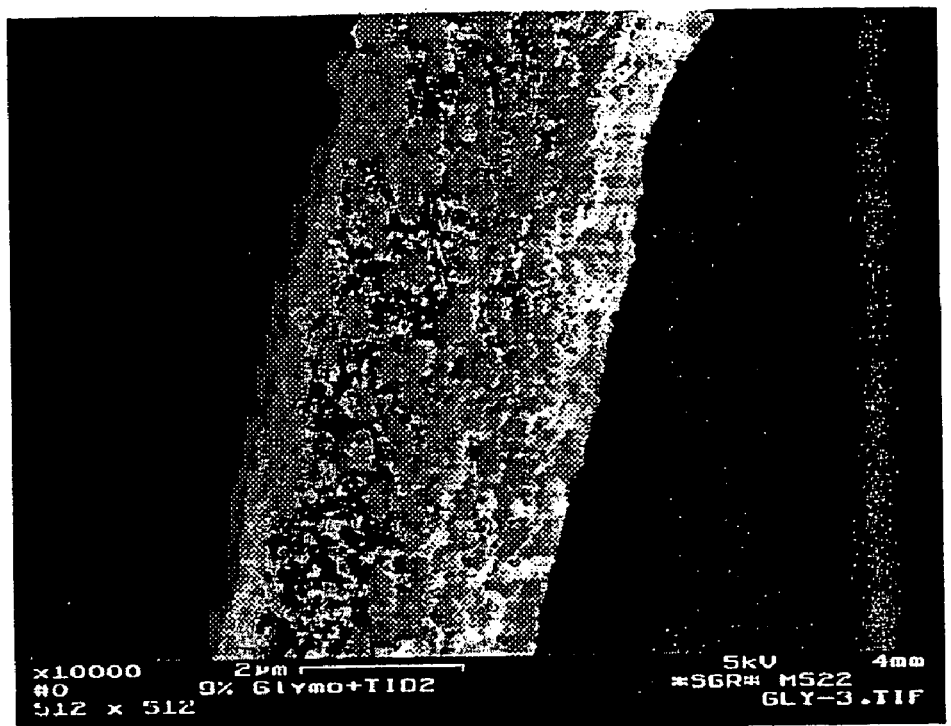
FIG. 1 shows a scanning electron microscopy (SEM) photograph of the surface of a fibrous material treated according to an embodiment of the invention.

All the following examples relate to the deposition of a coating for which the photocatalytic "active" components are made of anatase crystallized $TiO_2$. As mentioned above, the invention applies in the same way to semi-conducting "active" components with photocatalytic properties similar to anatase $TiO_2$ and which can be provided in the same form, in particular zinc oxide, tin oxide and tungsten oxide.

EXAMPLE 1

A needled felt (dimensions 210×297×5 mm³), composed of glass fibres of insulating type obtained by binder-face internal centrifuging and with a relative density of 55 kg/m³, was sprayed with an aqueous $TiO_2$ solution, sold under the trade name "TOSol" by Saga Céramics, over its entire thickness.

This solution containing particles of $TiO_2$ crystallized in anatase form, probably composed of crystallite agglomerates, these agglomerates having a mean size of the order of 20 to 80 nm. These particles are therefore the "active" components in terms of photocatalysis. The solution also contains an organometallic $TiO_2$ precursor which will decompose into predominantly amorphous $TiO_2$ by heat treatment and which will act as adhesion promoter.

The coating obtained was baked at 200° C. for 2 hours and contains anatase nanocrystals in an amorphous $TiO_2$ matrix. The yellow colour of the filter thus manufactured testifies to the presence of organic compounds originating from the precursor solution. After exposure to ultraviolet A radiation under a dose of 4 W/m² for 2 hours, the yellow colour has completely disappeared, which shows complete decomposition of the residual organic pollutants.

EXAMPLE 2

Glass fibre of insulation type obtained by binder-free internal centrifuging was converted by the papermaking route in pure water. The paper obtained, circular with a diameter of 100 mm and a weight per unit area of 150 g/m², was subsequently impregnated over its entire thickness by dip-coating it in an alcoholic dispersion containing, by volume, 5% water, 1% tetraethoxysilane (the adhesion promoter) and 1% anatase crystallized $TiO_2$ particles with a mean diameter of 30 nm (the "active" components). The paper was dried in the open air and then baked in an oven at 450° C. for 30 minutes. This filter was subsequently placed over an inlet orifice of a fume cupboard. A control filter, without anatase $TiO_2$, was placed over the neighbouring orifice. An ultraviolet A lamp shines on these filters at a dose of 4 W/m². After the cupboard had been operated for 15 days, the treater filter was still white, whereas the untreated filter was fouled.

EXAMPLE 3

A composition for the sizing of glass wool of insulation type obtained by internal centrifuging was manufactured by mixing:

55 G of resin obtained by condensation of phenol and formaldehyde in an initial formaldehyde/phenol molar ratio of approximately 3.2/1, which condensation is carried out conventionally with a catalyst in the form of sodium hydroxide at 5.5% by weight with respect to the phenol, 45 of urea, 3 g of aminopropyltrimethoxysilane, 0.3 g of ammonium sulphate, 6 g of 30% by volume aqueous ammonia, 1200 g of a 25% by weight dispersion in water of anatase crystallized $TiO_2$ particles, and 34 litres of water.

The $TiO_2$ particles have a mean diameter of approximately 45 nm. The adhesion promoter for the latter can be regarded as all the other components of the size and very particularly the silane.

This composition was sprayed via the sizing ring during a fiberizing of the glass wool under the centrifuging dishes. The felt obtained was subsequently passed on the line into an oven at 180° C. for 2 minutes. The felt has a weight per unit area of 560 g/m² and a loss on ignition of 1.4% (measurement known to a person skilled in the art, expressed by weight, by heating the felt at a temperature sufficient to remove all the organic compounds). A 1×20×40 mm³ piece was removed and placed in a vessel with 20 g of an aqueous solution comprising 1 g/l of ethanol and 15 mg/l of hydrogen peroxide. The solution was shone on by a mercury lamp producing 4 W/m² of ultraviolet radiation and the concentration of hydrogen peroxide was monitored by colorimetry. Oxidation of ethanol by hydrogen peroxide, catalysed by the anatase $TiO_2$ irradiated with ultraviolet radiation is observed.

The photocatalytic activity of the felt was evaluated by measuring the weight of hydrogen peroxide $H_2O_2$ in milligrams which disappears per gram of fibre in the solution and per hour. The result was 4.4 mg $H_2O_2$/g.fibre/hour.

Samples of 200×300×200 mm3, comirg from the same treatment, have been subject to natural sun exposure. Gradually the yellow colour that is characteristic for the resin used, disappeared from the exposed surfaces and to some centimetres in depth. This vanishing clearly indicated a degradation of the phenolic resin used as well as the penetration of the photocatalytic effect inside the material. Similar results were obtained und controlled UVA radiation of 4W/m² for 24 hours.

EXAMPLE 4

280 g of glycidoxypropyltrimethoxysilane was added to a sizing composition similar to that of Example 3 (other silane combining with the above to act as adhesion promoter). The felt obtained by fiberizing and sizing with this solution was stoved at 180° C. for 2 minutes. The felt has a weight per unit area of 1 kg/m² and a loss on ignition of 1.4%. The measurement of the photocatalytic activity, carried out as in Example 3, gave a value of 3 mg $H_2O_2$/g.fibre/hour.

Figure 2:
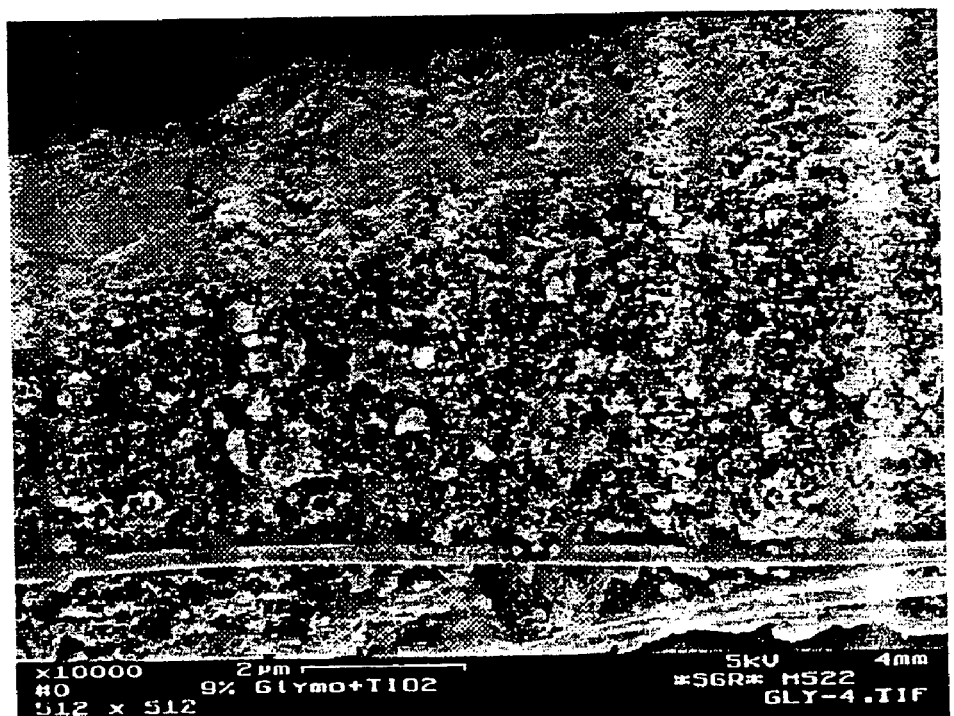
FIG. 2 is another SEM photograph showing the surface of the fibrous material shown in FIG. 1.
Figure 3:
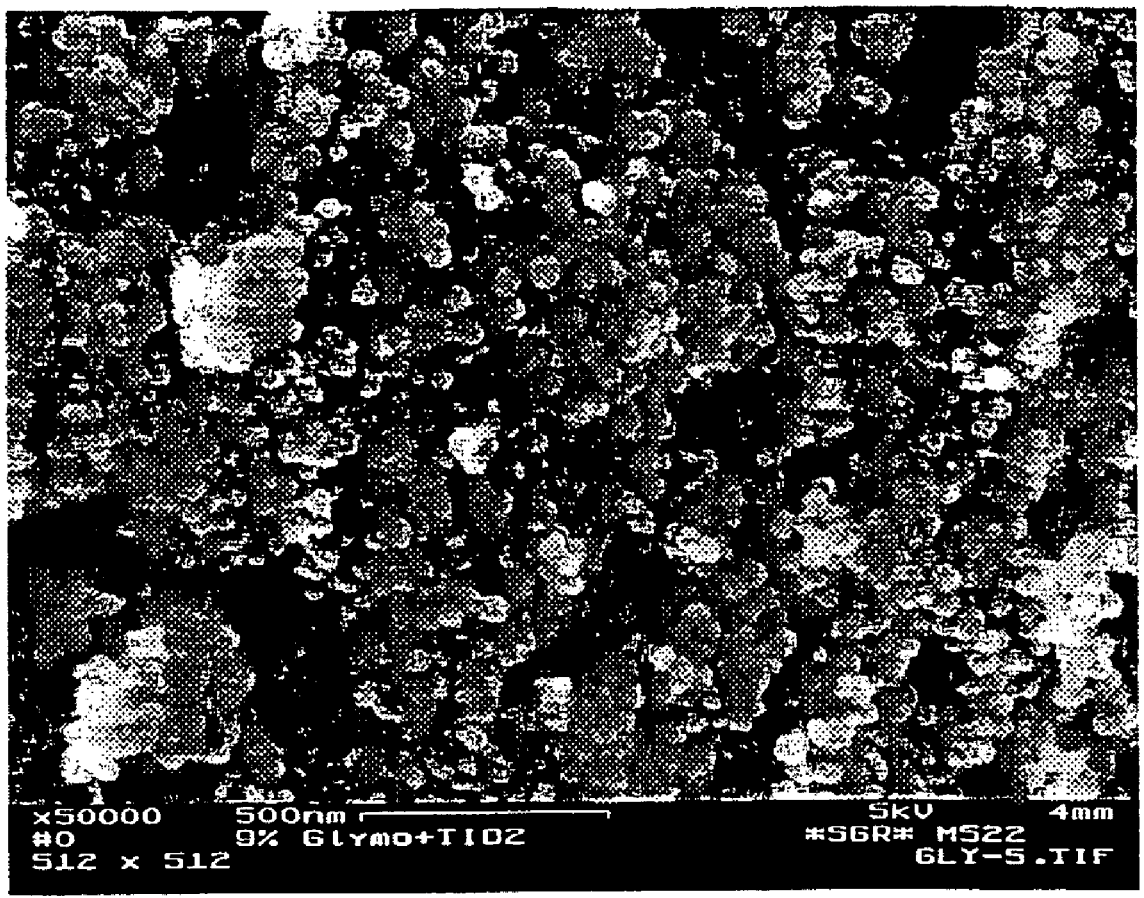
FIG. 3 is yet another SEM photograph showing the surface of the fibrous material shown in FIG. 1.

FIGS. 1, 2, and 3 show, in three different scales, a fibre covered with the photocatalytic coating. FIG. 1 shows more partcularly a fibre, at the surface of which is clearly distinguished a sheathing of $TiO_2$ particles, two successive magnifications being shown in FIGS. 2 and 3.

In conclusion, it is found that the coating of the invention exhibits a proven photocatalytic activity on fibres, whatever the implementational alternative forms:

Example 1 illustrates a deposition "in a subsequent operation", outside the line for the production of mineral wool, using "precrystallized" $TiO_2$ particles and an inorganic adhesion promoter manufactured in situ, on a fibrous substrate of felt type.

Example 2 also illustrates a deposition "in a subsequent operation", on a fibrous substrate of paper type, with pre-crystallized $TiO_2$ particles and a silicon-comprising adhesion promoter.

Examples 3 and 4 illustrate an in-line hot deposition under the fiberizing devices, which will make possible treatment within the thickness of the fibrous material, with "precrystallized" $TiO_2$ particles and adhesion promoters of the family of the silanes in combination with the components of a standard size, in the aqueous phase.

Photocatalytic webs based on mineral fibres were manufactured using a plant which makes it possible to carry out the impregnation of a glass web in a sizing solution, the application of suction to this web (in order to remove the excess binder) and, finally, its baking in an oven, the entire process being carried out in-line and continuously. The web is unwound on a conveyor belt, conveyed into the sizing bath via an impregnation roller, passes above a negative-pressure tank (suction device) and is finally conveyed by a second conveyor belt into the baking oven.

Various types of photocatalytic media were synthesized according to this process, in accordance with the following examples:

EXAMPLE 5

A Medium for the Purification of Gases

An 80 g/m² glass web was impregnated with an aqueous solution containing 3.1% of Glymo (glycidoxypropyltrimethoxysilane) and 2.9% of titanium dioxide nanoparticles at a rate of 0.2 m/min.

This web, having been subjected to a suction equivalent to a water column of 35 mm, was subsequently baked at 200° C. for 10 minutes. The resulting loss on ignition is 7%.

Measurements of effectiveness in the gas phase were then carried out under the following conditions: 150×200 mm² of the resulting product were placed in a cylindrical photocatalysis reactor. This reactor is composed of an axial UV-A lamp (365 nm), around which is surrounded, with a spacing of 1 cm, the photocatalytic medium in 3 layers, and of an aluminium jacket. The intensity of the irradiation on the web is 1 mW/cm². The reactor is inserted in a closed circuit, with recirculation, the gas passing through the medium from the inside of the closed cylinder over the web towards the outside.

The volume of the cell (photocatalysis reactor) is 0.9 l and that of the complete circuit (immobilized volume) is one litre. The experiments consisted in evaluating the photocatalytic decomposition of n-hexane.

To do this, various amounts of n-hexane (ranging up to 2000 ppm in air) were injected into the circuit, the flow rate of the latter being regulated at 1 l/min. At regular intervals, 50 µl samples of gas were withdrawn in order to measure the concentration of n-hexane present in the circuit.

It was shown that the direct decomposition by UV of n-hexane is negligible, just as its absorption by the medium. In contrast, n-hexane is virtually 100% decomposed in less than one hour when it passes through the photocatalytic medium, though under weak UV irradiation.

EXAMPLE 6

A Medium for Liquid Purification

According to the same process, a 60 g/m² glass web was impregnated in an aqueous solution containing 1 g/l of A1100 silane and 5 g/l of titanium dioxide (sold under the name P25 by Degussa) held in suspension by appropriate means.

The web was impregnated in-line at 0.6 m/min, the excess binder having been removed under a negative pressure of 90 mm of water column. The product was baked at 300° C. for 30 minutes. Measurements of effectiveness in the liquid phase were then carried out in order to describe this material.

A circular specimen of web (diameter 100 mm) was placed at mid-height in a 300 ml beaker. The bottom and the edges of the receptacle having been rendered opaque, the beaker is illuminated by a bank of UV-A lamps (365 mm) delivering a power of 3.5 mW/cm² to the web. An aqueous solution (deionized water) containing 10 mg/l of phenol is poured into the device and is kept stirred magnetically. The decrease in concentration of the phenol is then monitored, samples being withdrawn at regular time intervals, by a UV spectrometer sold by Dr Lange.

It could be confirmed that virtually 100% of the phenol had disappeared over approximately at most one hour.

More generally, these last two examples show the advantage of the use of a web formed of photocatalytic mineral fibres, such as those manufactured, in purification operations in a liquid medium as in the gas phase.

The invention claimed is:

1. A substrate comprising:
   a fibrous material; and
   a photocatalytic coating material coating at least a portion of the fibrous material and including a photocatalytic semi-conducting material and an adhesion promoter for promoting adhesion of the photocatalytic semi-conducting material to the fibrous material,
   wherein the photocatalytic semi-conducting material comprises titanium oxide which is at least partly crystallized in anatase form and the photocatalytic coating material coats fibers in the portion of the fibrous material over a thickness of between 30 and 50 nm, which is comparable to a means size of particles of the at least partly crystallized titanium oxide in anatase form.

2. The substrate according to claim 1, wherein the titanium oxide is in a form of one of particles in colloidal suspension and a powder.

3. The substrate according to claim 1, wherein the photocatalytic semi-conducting material comprises a titanium oxide from one of thermal decomposition of organometallic and at least one metal halide precursor in the photocatalytic coating material.

4. The substrate according to claim 1, wherein the adhesion promoter comprises at least one of an organic material and an organic/inorganic hybrid material.

5. The substrate according to claim 1, wherein the adhesion promoter comprises a silicon-comprising component selected from the group consisting of silane, silicone and siloxane.

6. The substrate according to claim 1, wherein the adhesion promoter comprises at least one organic polymer selected from the group consisting of acrylic polymers and fluorinated polymers.

7. The substrate according to claim 1, wherein the adhesion promoter comprises at least one oxide selected from the group consisting of $TiO_2$ and $SiO_2$ from one of thermal decomposition of silicon-comprising, organometallic or metal halide precursor(s) within the photocatalytic coating material.

8. The substrate according to claim 1, wherein the adhesion promoter comprises at least one inorganic component selected from the group consisting of aluminium phosphates, potassium aluminosilicates and calcium aluminosilicates.

9. The substrate according to claim 1, wherein the adhesion promoter forms part of a binder providing cohesion of the fibrous material.

10. The substrate according to claim 1, wherein the fibrous material comprises at least one of insulation mineral wool and reinforcing glass strands.

11. The substrate according to claim 1, wherein the fibrous material is one of web, felt, mould, paper and bulk material forms.

12. The substrate according to claim 1, wherein the fibrous material comprises one of a thermal insulation material, a sound insulation material, a liquid filter, a gas filter, a purifier, and a diffuser.

13. The substrate according to claim 1, wherein the adhesive promoter further comprises at least one additive selected from the group consisting of an antioxidant, an ultraviolet absorber and a hindered amine light stabilizer.

14. The substrate according to claim 1, wherein the adhesion promoter comprises at least one of an inorganic material and an organic/inorganic hybrid material.

15. A process for manufacturing a substrate, comprising:
    depositing a liquid binder to bind fibers and forms a fibrous material; and
    depositing a photocatalytic coating material in liquid phase over at least a portion of the fibrous material such that the photocatalytic coating material coats fibers in the portion of the fibrous material over a thickness of between 30 and 50 nm, which is comparable to a means size of particles of at least partly crystallized titanium oxide in anatase form, the photocatalytic material including a photocatalytic semi-conducting material and an adhesion promoter for promoting adhesion of the photocatalytic semi-conducting material to the firbous material,
    wherein the photocatalytic semi-conducting material comprises titanium oxide at least partially crystallized in anatase form.

16. The process according to claim 15, wherein the depositing the photocatalytic coating material after converting the fibrous material into a finished product and before subjecting the finished product to a heat treatment.

17. The process according to claim 15, wherein the depositing the photocatalytic coating material comprises one of spraying, coating and dip coating.

18. The process according to claim 15, wherein the depositing the photocatalytic coating material comprises depositing the photocatalytic coating material downstream of a fiberizing device before heat treatment/conditioning devices.

19. The process according to claim 15, wherein the depositing the photocatalytic coating material comprises depositing the photocatalytic material while the fibrous material is being formed into mats.

* * * * *